May 28, 1929. J. W. PEASE Re. 17,307

APPLE PARING MACHINE

Original Filed Feb. 1, 1926 6 Sheets-Sheet 1

Inventor
John W. Pease
By Crumpton & Hiffitt
his Attorneys

May 28, 1929. J. W. PEASE Re. 17,307

APPLE PARING MACHINE

6 Sheets-Sheet 2

Original Filed Feb. 1, 1926

Inventor
John W. Pease

By Crumpton & Griffith
his Attorneys

May 28, 1929. J. W. PEASE Re. 17,307

APPLE PARING MACHINE.

Original Filed Feb. 1, 1926 6 Sheets-Sheet 3

Inventor
John W. Pease
By Crumpston & Griffith
Attorneys

May 28, 1929. J. W. PEASE Re. 17,307

APPLE PARING MACHINE

Original Filed Feb. 1, 1926 6 Sheets-Sheet 4

Inventor
John W. Pease
By Crumpston & Griffith
his Attorneys

May 28, 1929. J. W. PEASE Re. 17,307

APPLE PARING MACHINE

Original Filed Feb. 1, 1926 6 Sheets-Sheet 5

Inventor
John W. Pease
By Crumpton & Griffith
his Attorneys

May 28, 1929. J. W. PEASE Re. 17,307

APPLE PARING MACHINE

Original Filed Feb. 1, 1926 6 Sheets-Sheet 6

Inventor
John W. Pease
By Crumpston & Griffith
his Attorneys

Reissued May 28, 1929. Re. 17,307

UNITED STATES PATENT OFFICE.

JOHN W. PEASE, OF ROCHESTER, NEW YORK, ASSIGNOR TO WINNIFRED N. PEASE, OF ROCHESTER, NEW YORK.

APPLE-PARING MACHINE.

Original No. 1,615,914, dated February 1, 1927, Serial No. 85,196, filed February 1, 1926. Application for reissue filed January 29, 1929. Serial No. 335,792.

My present invention relates to apple paring machines and more particularly to feeding devices therefor and it has for its object to provide a simple, convenient and rapid paring machine provided with a feeding device whereby the apples may be rapidly fed to a single fork with convenience and without danger to the operator. To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

Figure 1:
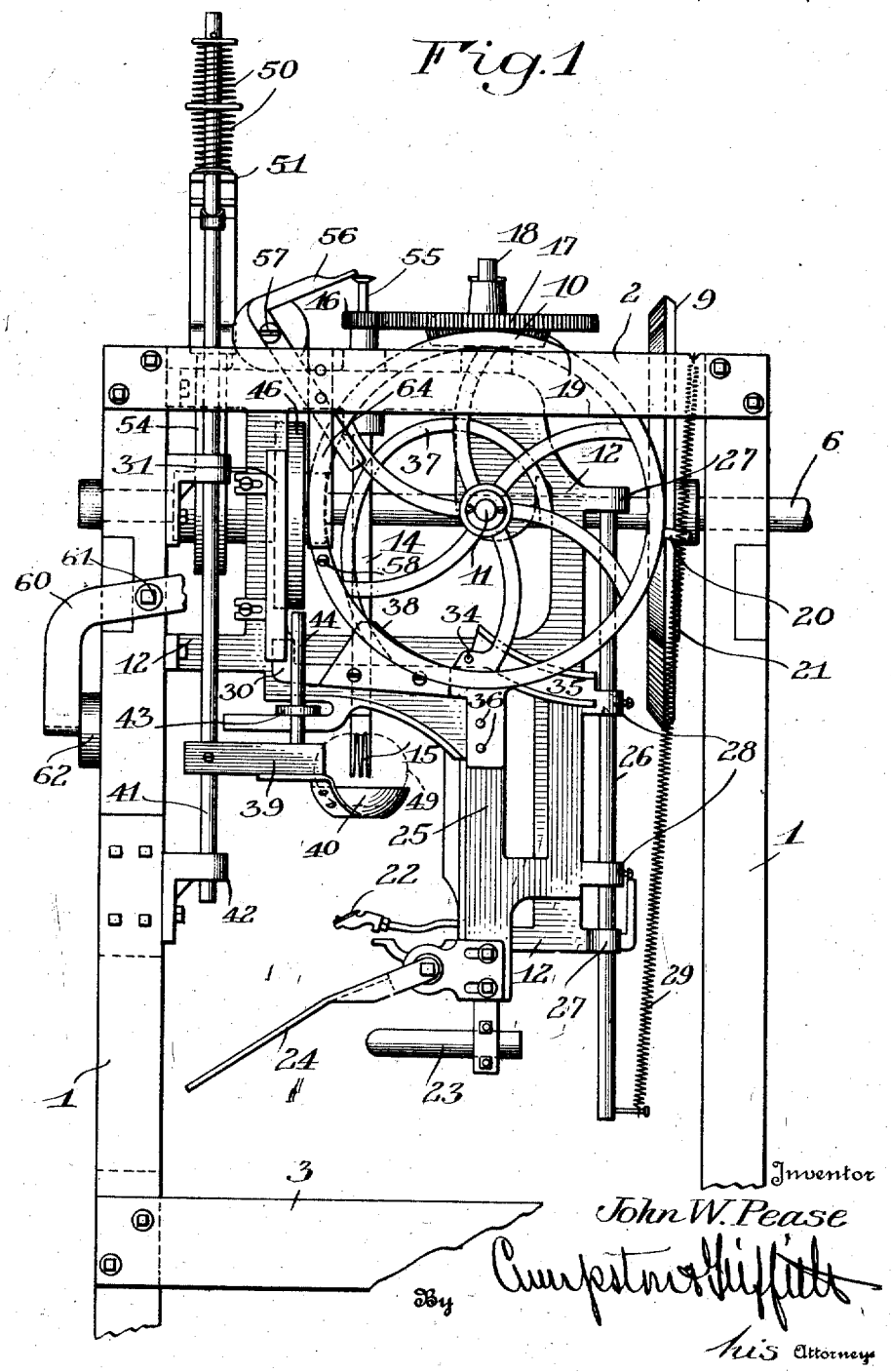
Figure 1 is a front elevation of a paring machine constructed in accordance with and illustrating one embodiment of my invention part of the frame thereof being broken away.

To first give a general idea of the main elements of my machine, it comprises a parer of somewhat the usual type except that it is arranged vertically instead of horizontally, that is, the paring fork rotates on a vertical axis and the corer and parer also, therefore, move vertically. It is a single fork machine and the fork has a fixed position except for its rotation. A horizontally swinging feeding cup moves outwardly or forwardly to a position convenient to the operation when receiving the apple which is placed therein by hand. The feeding cup then swings inwardly or rearwardly beneath the fork; upwardly to impale the apple upon the fork and then quickly moves downwardly and outwardly so as to clear the coring and paring elements that immediately thereafter start to operate upon the fruit. All of these movements are conducted in timed relation from a single drive shaft through the use of an interrupted gear, cams and springs all as hereinafter described.

Referring more particularly to the drawings, 1 indicates the uprights of a rectangular frame having cross pieces or rails 2 and 3 at the top and bottom. Just below the top rails 2 are side rails 4 running from front to rear upon which are supported the bearings 5 of a drive shaft 6. This drive shaft is shown in the present instance as being power driven with fast and loose pulleys 7 and 8 though a hand crank may of course be substituted.

It will perhaps be well to describe the parer proper first irrespective of the feeding mechanism.

Fixed to the shaft 6 is a main driving gear 9. This is an interrupter gear meshing with a gear 10 on a shaft 11 which runs from front to rear of the machine. It is a stud shaft carried by an inner frame 12 that supports the parer proper. The frame 12 is also provided with bearings 13 to carry a fixed shaft 14 having at its lower end a fork 15. All of the paring is done on this single fork. At the upper end of the shaft is a spur 16 by which it is driven from a gear 17 mounted on a vertical stud 18 on the frame 12. Below and fixed to the gear 17 is a bevel gear 19 that meshes with the gear 10. It having been stated that the main driving gear 9 is an interrupter gear, it will be seen that continuous rotation of the drive shaft 6 intermittently rotates the fork shaft 14.

To insure the meshing of the teeth on the interrupted driving gear 9 with the continuous gear 10 upon each cycle of the machine, the gear 10 is provided with a pin 20 which is kicked at the proper time by a projecting abutment 21 on the driving gear 9.

Figure 7:
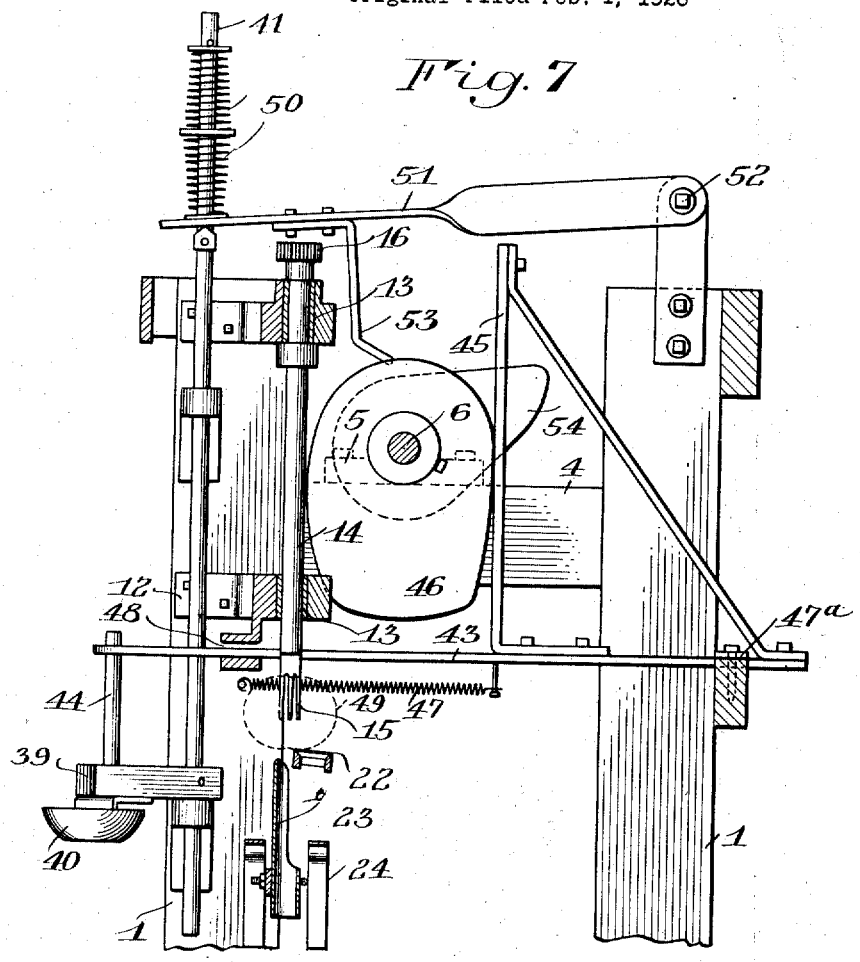
Figure 7 is another view similar to Figures 4 and 6 showing the parts in still another position.

The paring knife 22, corer 23, and doffer 24 operate as usual and will, therefore, not be described in any great detail. They are carried on a vertically reciprocating frame 25 having at one side a guide rod 26 that slides in fixed bearings 27 in the frame 12. The frame 25 is fixed to this guide rod 26 by means of the lugs 28 and connected to the lower end of the rod 26 is a counter-balancing spring 29 the upper end of which is connected to the frame 1 and the function of which is to break the fall of the frame 25 inasmuch as the parer is operating vertically instead of in the usual horizontal direction. On the opposite or left hand side of the frame 25 is a lug 30 which slides in a guide 31 on the frame 12. As the frame 25 moves upwardly, the knife 22 is carried into paring engagement with an apple on the fork 15 through the action of suitable cams on the frame 12 (not shown), all as usual, while the corer 23 by a similar cam action, swings up from the position of Figures 1 and 2 to that of Figure 7. These movements and operations of the corer and the paring knife are the usual ones and as they have nothing to do with the present invention, a more detailed description than the above is thought not to be warranted. The corer 23 swings upwardly and downwardly through the forked doffer 24. As the frame 25 descends and the corer 23 brings down the cored apple from the fork 15, the apple is disengaged by the doffer 24 which is fixed to the frame 25 at an angle and the apple is discharged into a chute 32 that conveys it to a suitable receptacle 33.

The upward movement of the frame 25 to carry the paring knife 22 and corer 23 into operation with respect to an apple placed on the fork 15 in the manner hereinafter described, is accomplished, initially, by the engagement of a pin 34 on the gear 10 with a cam track 35 on the frame 25. As soon as the said pin leaves the right hand end of this cam track, a pair of pins 36 on the frame engage on opposite sides of a spiral cam 37 projecting from the inner side of the gear 10. By the time these pins 36 reach the inner end of this cam 37 and free themselves, both the corer and paring knife have done their work and the frame 25 is as high as it has occasion to go. The frame immediately drops by gravity except for the check of the counter-balancing spring 29 with the consequent retracting movements of the paring knife 22 and corer 23 and the doffing of the apple. To insure a completion of this downward movement, however, the frame 25 is provided with a cam 38 which is engaged by the same pin 34 that thereafter cooperates with the track cam 35 previously described.

Figure 8:
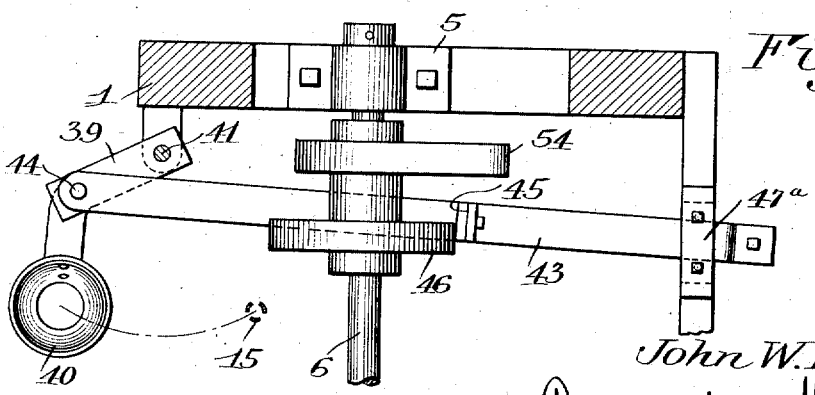
Figure 8 is a view similar to Figure 5 showing the operating cams of the feeding device in another position.

The feeding device comprises an arm 39 carrying a cup 40 and mounted upon a rod 41 which has a bearing in brackets 42 on the frame 1 in which it pivots and in which it is also slidable vertically. The pivotal movement of this arm 39 and feed cup 40 is for the purpose of carrying the cup from the receiving position of Figures 7 and 8 to the delivering position of Figures 1, 2, 4 and 6 beneath the fork 15. When in the receiving position of Figures 7 and 8 the operator, standing at the front of the machine, places an apple in the cup 40. The latter is then immediately drawn to a position beneath the stationary fork 15. This is accomplished by means of a pull rod 43 which is connected to a sliding pivot 44 on the arm 39. The pull rod 43 is provided with a vertical abutment 45 that is engaged by a cam 46 on the drive shaft 11. This cam draws the arm 39 and cup 40 inwardly and the latter into alignment with and beneath the fork 15 against the tension of a spring 47 connected to the frame 1 and to the pull rod 43, the tendency of which spring is to throw the feed cup 40 to the receiving position of Figures 7 and 8. The pull rod 43 is guided in a strap 47 on the frame 1 and also in a guide 48 in the frame 12.

Figure 2:
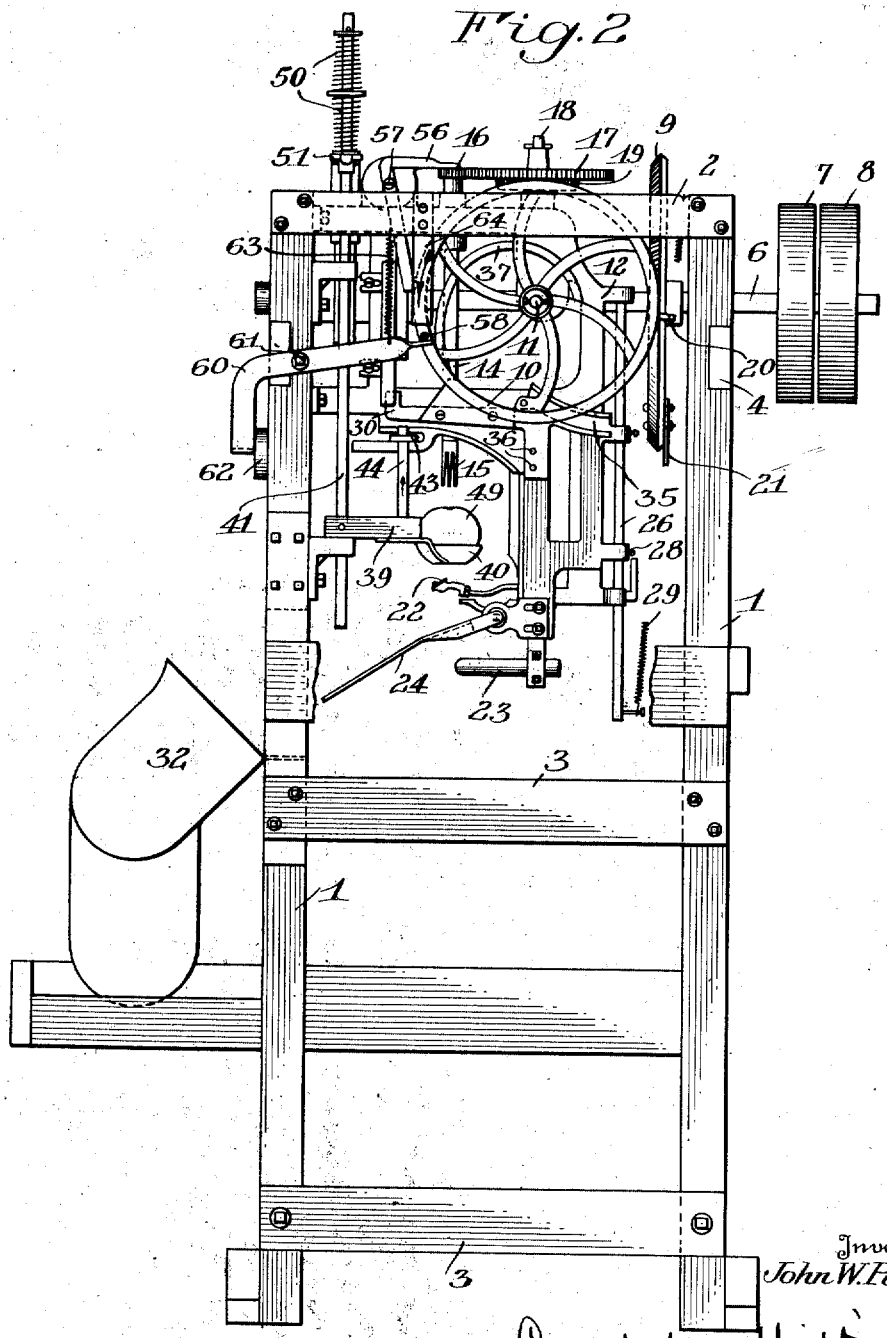
Figure 2 is a similar and more complete front view with the parts in another position.
Figure 3:
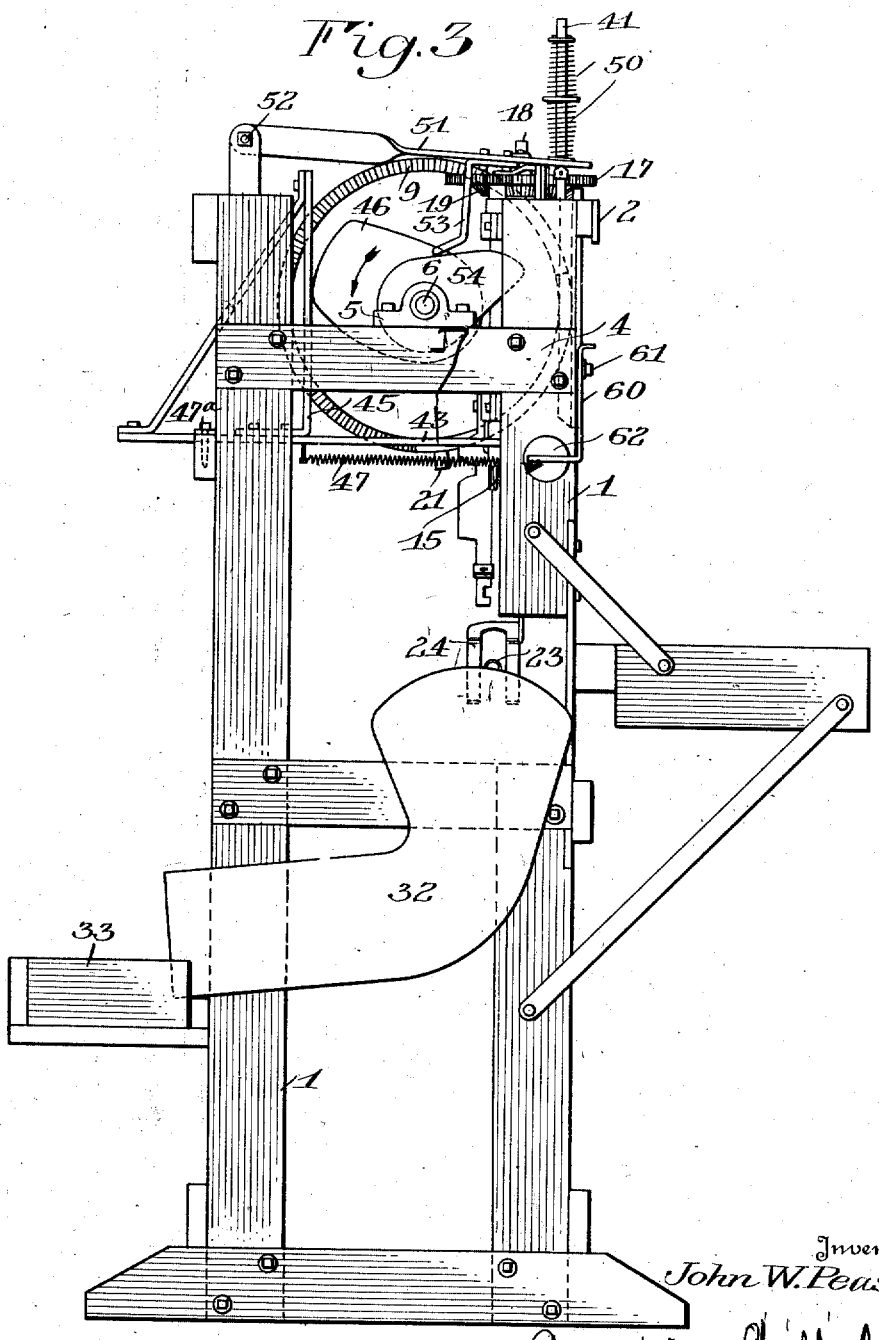
Figure 3 is a side view of the machine showing that end thereof which is opposite to the driving end.
Figure 4:
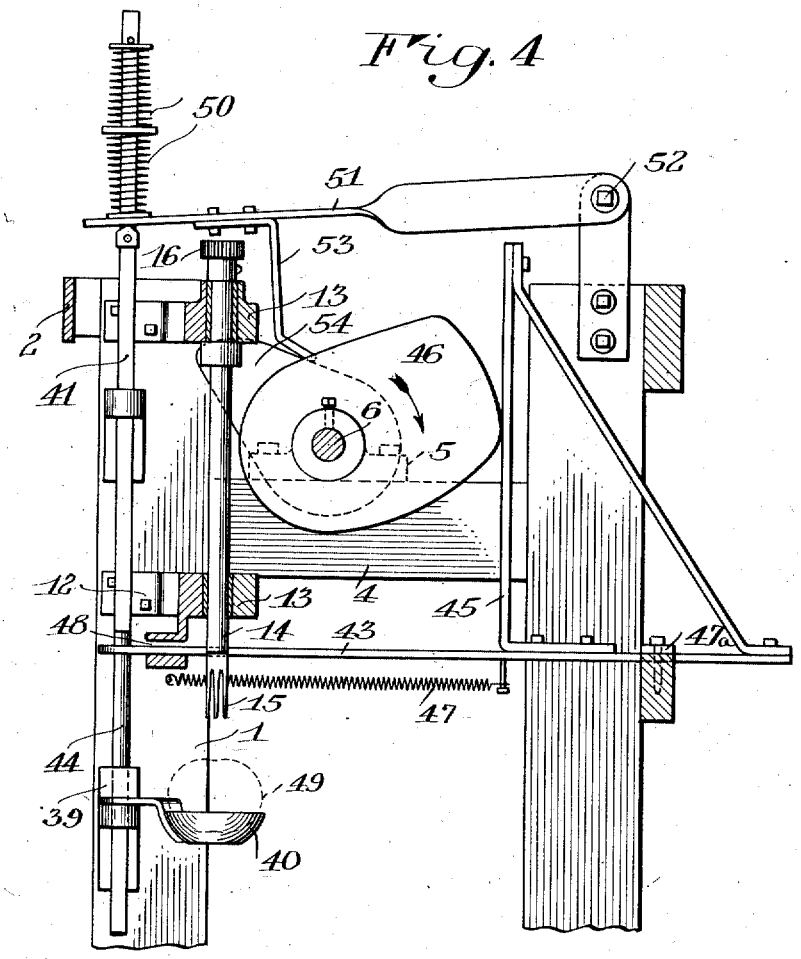
Figure 4 is an enlarged fragmentary section taken from front to rear in the plane of the axis of the fork and transversely through the driving and cam shaft.
Figure 5:
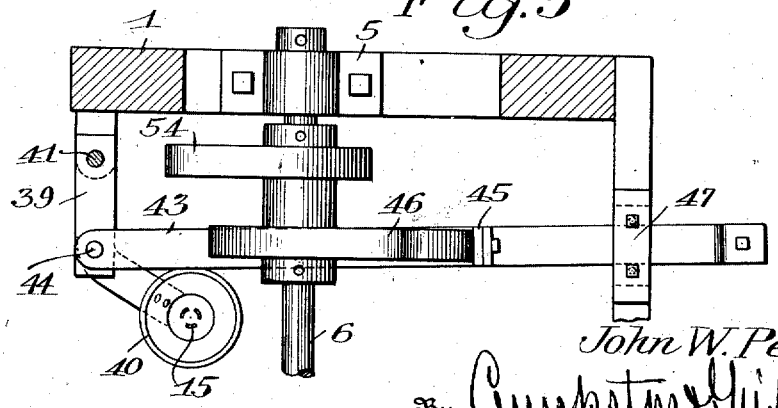
Figure 5 is a fragmentary horizontal section showing in detail the cams on the driving shaft for operating the feeding device.
Figure 6:
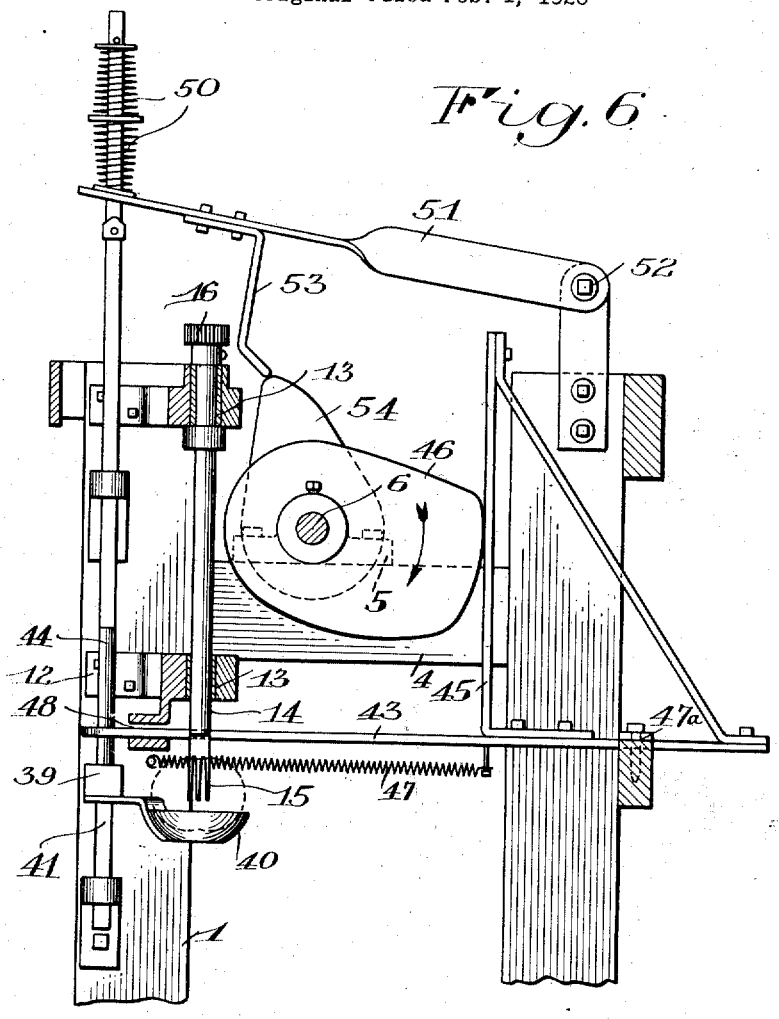
Figure 6 is a view similar to Figure 4 showing the parts in another position.
Figure 9:
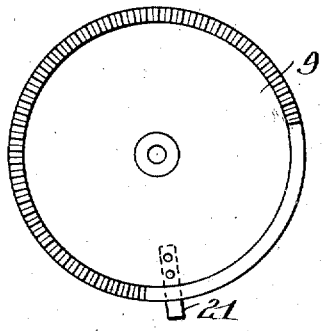
Figure 9 is a detail elevation of the main driving gear.
Figure 10:
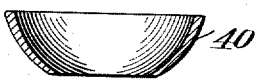
Figure 10 is an enlarged section through the feeding cup or apple holder.

After the feeding cup 40 has been swung in this manner into a position below the fork 15 with an apple contained therein as indicated at 49 in Figure 2, it is necessary to give it a vertical reciprocatory motion, that is, to carry upwardly and impale the apple on the fork. This is accomplished through a vertical sliding movement of the pivot rod 41 in the brackets 42. The upper end of the rod 41 is engaged beneath a pair of adjustable springs 50 by the forked end of a lever 51 extending from front to rear of the machine. It is pivoted at 52 (Figure 4) at the rear of the machine and has an arm 53 that rides on a cam 54 on the drive shaft 6. This cam is so shaped as to raise the lever 51 abruptly and then abruptly drop it so that the up and down movement of the feed cup 40 is very rapid. Its action is this: After receiving the apple it is swung by the cam 46 to a position in alignment with and beneath the fork 15 while the knife 22 and corer 23 are down as in Figure 2; it then moves upwardly and impales the apple on the fork as shown in Figure 1; its next movement is a rapid drop as the arm 53 falls off of the high point of the cam 54. Immediately thereafter and before the knife and corer have a chance to rise, the feed cup swings forwardly again under the influence of its spring the abutment 45 having been released from the high point of cam 46. Thus, another apple can be placed in the cup while the paring operation is being conducted on its predecessor.

The pivot 44 by means of which the draw rod 43 is connected to the arm 39 is a long pivot and has a vertical sliding movement in the arm to permit the impaling of the apple as above described.

The fork shaft 14 is a hollow shaft and contains a push rod 55 which is raised as shown in Figure 1 when the apple is impaled upon the fork as it ordinarily projects between the tines of the fork. The upper end of this push rod projecting from the spur 16 is engaged by a bell crank lever 56 pivoted at 57 to the frame. After the paring operation a pin 58 on the gear 10 engages this lever and causes it to push the rod 55 downwardly and eject the core from the apple after the corer 23 has swung out of the way.

This pin 58 also performs another function. A bell crank lever 60 is pivoted to the frame at 61 and has one end normally held against a rubber buffer 62 by a spring 63. The other end is in the path of the pin 58. Just as the parer carriage 25 reaches its downward position, and the toothed portion of the driving gear 9 moves out of mesh with the gear 10, the pin 58 engages this lever 60 which gives sufficient yielding resistance to prevent it from overrunning, that is, it holds it in position while the blank portion of the driving gear 9 is passing the gear 10. To prevent a re-bound of the gear 10 upon the descent of the carriage, there is also provided a spring latch 64 under which the pin 58 rides, this latch being secured to the cross piece 2 of the main frame 1. When the driving gear 9 again picks up the gear 10, the lever 60 yields and the pin 58 rides off the end thereof.

A machine constructed in accordance with this invention will be observed to utilize a single fixed fork doing away with the usual turret arrangement of a plurality of revolving forks and the action of the feeding cup 40 in swinging into alignment; into impaling contact, and then out again with great rapidity gives, nevertheless, great capacity and a high speed paring operation.

I wish to call attention to another feature of this invention having to do with the fact that the single fork is intermittently driven and receives the apple while the fork is at rest irrespective of the specific feeding or apple applying mechanism that is used. It is obvious that when an apple which is rotatably at rest is thrust upon a revolving fork the tendency is that the fork will bore or drill in to the center of the apple and tear its interior. In the case of a soft apple, the fork is even apt to destroy it during the period between the impaling and the time that the apple is relieved from the resistance of its feeding holder. With the fork at rest during the entire period of the application of the apple thereto these objections are entirely obviated because the fork does not again begin to rotate until the apple is firmly impaled and the holder has released its pressure and is moving away. The function of the fork is to hold the apple—not to core it, which latter is the sole function of the coring spoon 23.

I claim as my invention:

1. In a paring machine, the combination with a rotary fork turning on a fixed axis, of a knife cooperating therewith, and a feeding device embodying a fruit holder adapted to move in a relatively transverse plane into and out of alignment with the fork in timed relation to the movements of the knife, the movement of the latter being through the path of the fruit holder.

2. In a paring machine, the combination with a rotary fork turning on a fixed axis, of means for intermittently driving the fork, a knife cooperating therewith and a feeding device embodying a fruit holder adapted to move in a relatively transverse plane into and out of alignment with the fork and in an axial direction toward the fork when the latter is at rest, the movement of the knife being through the path of the fruit holder.

3. In a paring machine, the combination with a rotary fork turning on a fixed axis, of means for intermittently driving the fork, a carriage provided with paring and coring devices adapted to reciprocate in an axial direction toward and from the fork, and a feeding device embodying a fruit holder adapted to move in a relatively transverse plane into and out of alignment with the fork and in an axial direction toward the fork when the latter is at rest and in timed relation to the movement of the carriage.

4. In a paring machine, the combination with a rotary fork turning on a fixed axis, of means for intermittently driving the fork, a carriage provided with paring and coring devices adapted to reciprocate in an axial direction toward and from the fork, a feeding device embodying a fruit holder, means for positively moving the fruit holder in a relatively transverse plane into alignment with the fork and thence axially toward the same when the latter is at rest and a spring for retracting the fruit holder in timed relation to the movement of the carriage.

5. In a paring machine, the combination with a rotary fork turning on a fixed axis, of means for intermittently driving the fork, paring and coring devices cooperating with the fork while the latter is rotating, and a feeding device arranged to move transversely into alignment with the fork and axially toward the same when the latter is at rest and in timed relation to the movements of the paring and coring devices.

6. In a paring machine, the combination with a fork arranged to rotate on a fixed axis and a carriage adapted to reciprocate in a direction parallel with the axis of the fork and provided with paring and coring devices, of a feeding device adapted to swing in a relatively lateral direction into alignment with the fork, means for reciprocating the carriage, means for swinging the feeding device in timed relation thereto and a spring for retracting the feeding device out of alignment with the fork before the operative movement of the paring and coring devices toward the same.

7. In a paring machine, the combination with a rotary fork arranged to turn on a fixed axis, driving means for intermittently rotating said fork, a carriage movable axially toward and from said fork and carrying coring and paring devices, said carriage also being operated by said driving means, a feeding device embodying a fruit holder arranged to swing laterally into and out of alignment with the fork and thence axially toward the fork while the latter is at rest, means connected with the driving means for positively actuating the fruit holder into such aligned position and along the axis of the fork, and a spring for retracting the fruit holder prior to the operative movement of the paring and coring devices.

8. In a paring machine, the combination with a rotary fork arranged to turn on a fixed axis, a drive shaft having a gearing for intermittently rotating said fork and provided with a pair of cams, a carriage movable axially toward and from said fork and carrying coring and paring devices, means connected with the drive shaft for operating said carriage, a feeding device embodying a fruit holder arranged to swing laterally into and out of alignment with the fork and thence axially toward the fork while the latter is at rest, said swinging movements of the fruit holder into alignment with and toward the fork being actuated by the cams on the drive shaft, and a spring for retracting the fruit holder prior to the operative movement of the paring and coring devices.

9. In a paring machine, the combination with a rotary fork adapted to turn on a vertical axis and a carriage provided with paring and coring devices adapted to move vertically into and out of cooperative relationship therewith, of driving means for the fork connected to raise the carriage and carry the paring and coring devices into operative positions and a spring connected to the carriage to break the fall thereof when released from the driving means.

10. In a paring machine, the combination with a vertically arranged fork, a drive shaft and interrupted gearing for intermittently rotating the fork, of a vertically reciprocatory carriage having coring and paring devices adapted to move upwardly into cooperative relationship with the fork, a cam wheel connected with the drive shaft for raising the carriage and a spring connected with the latter to check its fall when the cam wheel disengages therefrom and the paring and coring devices drop to an inoperative position with respect to the fork.

11. In a paring machine, the combination with a vertically arranged fork adapted to rotate upon its own axis and a vertically movable carriage provided with coring and paring devices, of a drive shaft for intermittently rotating the fork, a cam wheel for raising the carriage to carry the coring and paring devices into operative relationship with the fork, said carriage being arranged to drop by gravity when released from the cam wheel, a drive shaft for actuating the cam wheel and intermittently rotating the fork, a spring arranged to break the fall of the carriage when released from the cam wheel, and another cam on the carriage adapted to be engaged by the cam wheel to hold the carriage in a lowered inoperative position against the tension of the spring.

12. In a paring machine, the combination with a vertically arranged fork adapted to rotate upon its own axis and a vertically movable carriage provided with coring and paring devices, of a drive shaft for intermittently rotating the fork, a cam wheel for raising the carriage to carry the coring and paring devices into operative relationship with the fork, said carriage being arranged to drop by gravity when released from the cam wheel, a drive shaft for actuating the cam wheel and intermittently rotating the fork, a spring arranged to break the fall of the carriage when released from the cam wheel, of a feeding device embodying a fruit holder movable into and out of alignment with the fork and axially toward the same and another cam on the carriage adapted to be engaged by the cam wheel to positively move the carriage to inoperative position when the fruit holder moves into alignment with the fork.

13. In a paring machine, the combination with a fork arranged to turn upon a fixed axis, a carriage movable in parallelism to said axis and carrying coring and paring devices and means for intermittently rotating the fork and actuating the carriage, of a feeding device embodying a swinging fruit holder, a draw bar for swinging the fruit holder into alignment with the fork, a cam for moving the fruit holder axially toward the fork and a spring for quickly swinging the fruit holder out of alignment with the fork.

14. In a paring machine, the combination with a vertically arranged fork, driving means for intermittently rotating said fork embodying an interrupted driving gear and a driven gear, cooperating means on the driving and driven gears for kicking the latter into mesh, paring and coring devices cooperating with the fork while the latter is rotating and a feeding device embodying a fruit holder adapted to swing laterally into alignment with the fork while the latter is at rest and to thence move axially toward the same.

15. In a paring machine, the combination with a rotary fork and driving means embodying interrupted gearing for intermittently rotating said fork, of coring and paring devices cooperating with the fork when the latter is in rotation, a feeding device actuated by the driving means to swing laterally into alignment with the fork and thence axially toward the same when the fork is at rest and a latch for holding the fork driving means against a rebounding movement while the feeding device is moving operatively with relation thereto.

16. In a paring machine, the combination with a rotary fork, a drive shaft, interrupted gearing for intermittently rotating the fork through the movement of the drive shaft, a carriage movable in parallelism to the axis of the fork and carrying paring and coring devices, means including the interrupted gearing for actuating the carriage, a feeding device embodying a swinging fruit holder, a cam on the drive shaft for swinging the fruit holder into alignment with the fork, a cam on the drive shaft for moving the fruit holder axially toward the fork and springs for throwing the fruit holder axially away from the fork and laterally out of alignment therewith.

17. In a paring machine, the combination with a vertically arranged fork arranged on a fixed axis, a drive shaft, interrupted gearing connecting the shaft and fork for intermittently rotating the latter, a vertically movable carriage provided with paring and coring devices, means embodied in the interrupted gearing for actuating the carriage toward the fork while the latter is in rotation, a latch for arresting the gearing when the fork is at rest, a feeding device embodying a swinging fruit holder, means on the drive shaft for swinging the fruit holder into alignment with the fork in timed relation to the movement of the carriage, means on the drive shaft for moving the fruit holder toward the fork while the latter and the carriage are at rest and springs for retracting the fruit holder prior to a subsequent movement of the carriage.

18. In a paring machine, the combination with a fork arranged to turn on a fixed axis and means for intermittently driving the same, of coring and paring devices cooperating with the fork while the latter is rotating, a swinging fruit holder aranged on a sliding pivot, means for swinging said fruit holder on said pivot into alignment with the fork in timed relation to the movement of the carriage, means for sliding the fruit holder on its pivot toward the fork and means for retracting the fruit holder prior to the operative movement of the carriage.

19. In a paring machine, the combination with a drive shaft, a vertically arranged fork, gearing between the drive shaft and the fork for intermittently rotating the latter, a latch for holding said gearing while the fork is at rest, a vertically movable carriage provided with paring and coring devices cooperating with the fork while the latter is in rotation, means embodying said gearing for actuating the carriage axially of the fork, a feeding device embodying a swinging fruit holder and means on the drive shaft for actuating said fruit holder laterally into alignment with the fork and also axially in relation thereto.

20. In a paring machine, the combination with a drive shaft, a vertically arranged fork, gearing between the drive shaft and the fork for intermittently rotating the latter, a latch for holding said gearing while the fork is at rest, a vertically movable carriage provided with paring and coring devices cooperating with the fork while the latter is in rotation, means embodying said gearing for actuating the carriage axially of the fork, a feeding device embodying a swinging fruit holder, cams on the drive shaft for swinging the fruit holder into alignment with the fork and also moving it axially thereof and springs for effecting a reverse axial and swinging movement of the fruit holder.

21. In a paring machine, the combination with a rotary fork arranged to turn on a fixed vertical axis, of a knife adapted to cooperate therewith and a feeding device embodying a horizontally swinging fruit holder adapted to move into and out of alignment with the fork in timed relation to the movements of the knife.

22. In a paring machine, the combination with a rotary fork turning on a fixed vertical axis and means for intermittently driving the same, of a carriage provided with coring and paring devices movable vertically toward and from the fork and a feeding device embodying a fruit holder adapted to move horizontally into alignment with the fork and axially toward the same when the fork is at rest and means for driving the carriage and fruit holder in timed relation to each other.

23. In a paring machine, the combination with a rotary fork turning on a fixed vertical axis, of means for intermittently driving the fork, paring and coring devices cooperating with the fork when the latter is in rotation, a horizontally swinging fruit holder, means for moving it into alignment with the fork when the carriage is in inoperative position, means for moving it axially toward the fork when the latter is at rest and means for retracting the fruit holder as the carriage moves into operative relationship with the fork.

24. In a paring machine, the combination with a rotary fork turning on a fixed axis, of means for intermittently driving the fork, and a feeding device embodying a fruit holder adapted to move in an axial direction toward the fork to present an apple thereto when the latter is at rest.

25. In a paring machine, the combination with a rotary fork turning on a fixed axis, of means for intermittently driving the fork, a knife cooperating therewith, and a feeding device embodying a fruit holder arranged to move toward the fork when the latter is at rest to impale an apple thereupon, the movement of the knife being through the path of the fruit holder.

JOHN W. PEASE.